(12) United States Patent
Cui

(10) Patent No.: US 10,791,167 B2
(45) Date of Patent: Sep. 29, 2020

(54) USER MIGRATION

(71) Applicant: New H3C Technologies Co., Ltd, Zhejiang (CN)

(72) Inventor: Xiaohui Cui, Beijing (CN)

(73) Assignee: NEW H3C TECHNOLOGIES CO., LTD, Hangzhou (CN)

(*) Notice: Subject to any disclaimer, the term of this patent is extended or adjusted under 35 U.S.C. 154(b) by 53 days.

(21) Appl. No.: 15/745,345

(22) PCT Filed: Sep. 28, 2016

(86) PCT No.: PCT/CN2016/100527
§ 371 (c)(1),
(2) Date: Jan. 16, 2018

(87) PCT Pub. No.: WO2017/054718
PCT Pub. Date: Apr. 6, 2017

(65) Prior Publication Data
US 2018/0213032 A1   Jul. 26, 2018

(30) Foreign Application Priority Data

Sep. 29, 2015   (CN) .......................... 2015 1 0629473

(51) Int. Cl.
*H04L 29/08*        (2006.01)
*H04L 12/713*       (2013.01)
(Continued)

(52) U.S. Cl.
CPC ........ *H04L 67/1029* (2013.01); *H04L 12/287* (2013.01); *H04L 29/08* (2013.01);
(Continued)

(58) Field of Classification Search
CPC ... H04L 67/1029; H04L 12/287; H04L 29/08; H04L 41/0896; H04L 45/586;
(Continued)

(56) References Cited

U.S. PATENT DOCUMENTS

2004/0156372 A1* 8/2004 Hussa ................... H04W 48/20
                                                   370/401
2006/0069761 A1* 3/2006 Singh .................. H04L 67/1008
                                                   709/222
(Continued)

FOREIGN PATENT DOCUMENTS

CN        102045729        5/2011
CN        102112981 A      6/2011
(Continued)

OTHER PUBLICATIONS

International Search Report issued in PCT/CN2016/100527, dated Dec. 5, 2016.

*Primary Examiner* — Tonia L Dollinger
*Assistant Examiner* — Jihad K Boustany
(74) *Attorney, Agent, or Firm* — McCarter & English, LLP; Kia L. Freeman; Thomas F. Foley

(57) ABSTRACT

A NFV Manager receives user traffic notified by each sub vBRAS of each vBRAS. The NFV Manager calculates user traffic of the each vBRAS, selects a source vBRAS and a target vBRAS from all of the vBRASs, selects a migration sub vBRAS needing to migrate from the source vBRAS to the target vBRAS, and notifies the source vBRAS to send data relevant to the migration sub vBRAS to the target vBRAS.

12 Claims, 4 Drawing Sheets

(51) Int. Cl.
H04L 12/28 (2006.01)
H04L 12/24 (2006.01)
G06F 9/445 (2018.01)

(52) U.S. Cl.
CPC ........ H04L 41/0896 (2013.01); H04L 45/586 (2013.01); H04L 67/101 (2013.01); *G06F 9/4451* (2013.01)

(58) Field of Classification Search
CPC ....... H04L 67/101; G06F 9/50; G06F 9/4451; G06F 2009/4557
See application file for complete search history.

(56) References Cited

U.S. PATENT DOCUMENTS

| | | | |
|---|---|---|---|
| 2007/0130566 A1* | 6/2007 | van Rietschote | G06F 9/45533 718/1 |
| 2010/0027420 A1 | 2/2010 | Smith | |
| 2011/0002240 A1* | 1/2011 | Harel | H04L 45/02 370/254 |
| 2011/0173329 A1* | 7/2011 | Zhang | G06F 1/3206 709/226 |
| 2012/0324073 A1* | 12/2012 | Dow | G06F 9/06 709/223 |
| 2014/0229944 A1 | 8/2014 | Wang et al. | |
| 2015/0236900 A1* | 8/2015 | Chung | H04L 41/082 709/221 |
| 2016/0142474 A1 | 5/2016 | Itsumi et al. | |
| 2016/0196158 A1* | 7/2016 | Nipane | G06F 9/45558 718/1 |
| 2017/0060628 A1* | 3/2017 | Tarasuk-Levin | G06F 9/45558 |

FOREIGN PATENT DOCUMENTS

| | | |
|---|---|---|
| CN | 102143068 A | 8/2011 |
| CN | 102801715 | 11/2012 |
| CN | 103118434 | 5/2013 |
| JP | 2008042665 A | 2/2008 |
| WO | 2014208538 A1 | 12/2014 |

* cited by examiner

USER MIGRATION

BACKGROUND

Network Functions Virtualisation (NFV) application networking may include a virtual Broadband Remote Access Server (vBRAS) and a NFV Manager.

The vBRAS is a physical service function node and may perform verification for access users as a gateway of the access users. The NFV Manager may be included in a cloud management platform, and is used to manage each vBRAS, and assign vBRASs for users to access so that different users may access different vBRASs for being provided with process services. The NFV Manager may be also used to monitor a running state of each vBRAS in real time, start a new vBRAS to share subsequent traffic when discovering vBRAS service loads are too heavy, and close a certain vBRAS for saving resources when the service load of the certain vBRAS is too low.

DETAILED DESCRIPTION

As used herein, the term "includes" means includes but not limited to, the term "including" means including but not limited to. The term "based on" means based at least in part on. In addition, the terms "a" and "an" are intended to denote at least one of a particular element.

Figure 1:
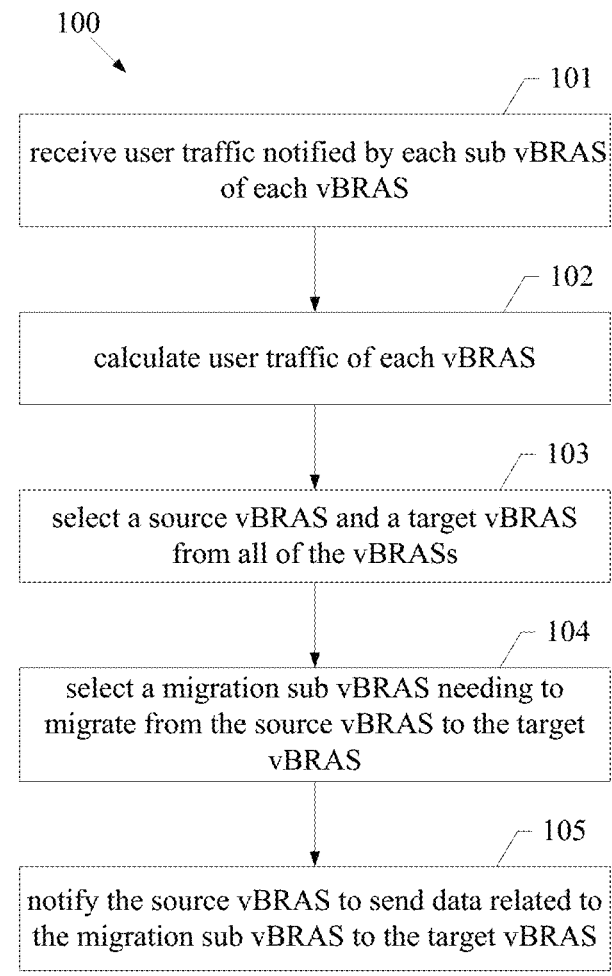
FIG. 1 is a flowchart illustrating a user migration method according to an example of the present disclosure.

FIG. 1 is a flowchart illustrating a user migration method 100 according to an example of the present disclosure. The method 100 may be performed by a NFC Manager to make a sub vBRAS of access users migrate between vBRASs. The method may start from process 101.

At process 101, the NFV Manager may receive user traffic notified by each sub vBRAS of each vBRAS.

At process 102, the NFV Manager may calculate user traffic of each vBRAS.

At process 103, the NFV Manager may select a source vBRAS and a target vBRAS from all of the vBRASs and select a migration sub vBRAS needing to migrate from the source vBRAS to the target vBRAS.

At process 104, the NFV Manager may notify the source vBRAS to send data relevant to the migration sub vBRAS to the target vBRAS. The data relevant to the migration sub vBRAS at least include: a MAC address of the migration sub vBRAS which is used as identification information of the migration sub vBRAS, the number of users accessing the migration sub vBRAS, traffic of the users accessing the migration sub vBRAS, and etc.

The NFV Manager may make the sub vBRAS accessed by the users migrate between the vBRASs by taking the sub vBRAS as a unit according to the method shown in FIG. 1. Hence, the users may migrate between different vBRASs, and thus network resilience of the NFV network is improved.

Figure 2:
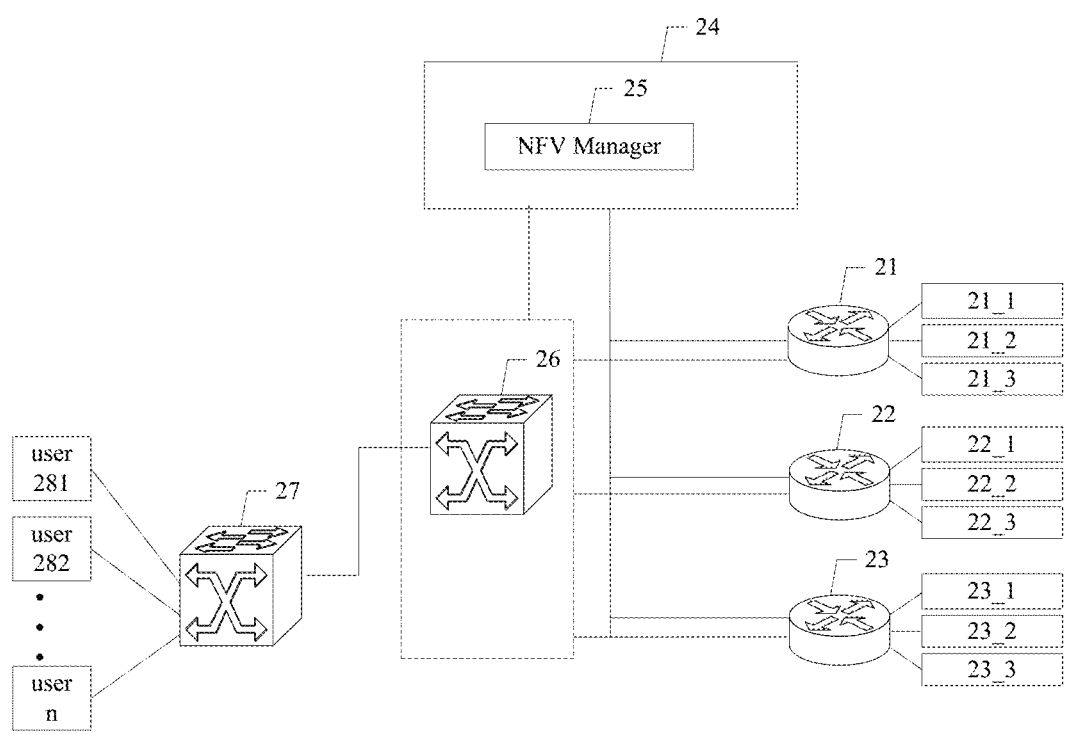
FIG. 2 is a diagram illustrating a network according to an example of the present disclosure.

FIG. 2 is a diagram illustrating a network according to an example of the present disclosure. MAC addresses of three vBRASs, i.e. vBRAS21, vBRAS22 and vBRAS23 are MAC1, MAC2 and MAC3 respectively. A NFV Manager 25 running on a cloud management platform 24 manages the vBRAS21, vBRAS22 and vBRAS23.

The vBRAS21 is configured with three sub vBRASs, i.e. sub vBRAS21_1, sub vBRAS21_2 and sub vBRAS21_3, through virtualization software. The three sub vBRASs 21_1 to 21_3 are used as virtual gateways, and MAC addresses of the sub vBRAS21_1, sub vBRAS21_2 and sub vBRAS21_3 are MAC21_1, MAC21_2 and MAC21_3 respectively.

The vBRAS22 is configured with three sub vBRASs, i.e. sub vBRAS22_1, sub vBRAS22_2 and sub vBRAS22_3, through virtualization software. The three sub vBRASs 22_1 to 22_3 are used as virtual gateways, and MAC addresses of the sub vBRAS22_1, sub vBRAS22_2 and sub vBRAS22_3 are MAC22_1, MAC22_2 and MAC22_3 respectively.

The vBRAS23 is configured with three sub vBRASs, i.e. sub vBRAS23_1, sub vBRAS23_2 and sub vBRAS23_3, through virtualization software. The three sub vBRASs 23_1 to 23_3 are used as virtual gateways, MAC addresses of the sub vBRAS23_1, sub vBRAS23_2 and sub vBRAS23_3 are MAC23_1, MAC23_2 and MAC23_3 respectively.

The sub vBRAS21_1 starts and sends a register request packet carrying the MAC21_1 and information of the vBRAS21 to which the sub vBRAS21_1 belongs to the NFV Manager 25. The sub vBRAS21_1 also sends a Reverse Address Resolution Protocol (RARP) request packet, in which a source MAC address is MAC21_1.

The NFV Manager 25 receives the register request packet from the sub vBRAS21_1, records the MAC address of MAC21_1 requested to be registered by the sub vBRAS21_1 and the information of the vBRAS21 to which the sub vBRAS21_1 belongs.

An aggregation switch 26 receives the RARP request packet from the sub vBRAS21_1 and learns a MAC address entry based on a port receiving the RARP request packet and the source MAC address.

The processing of sending the register request packet to the NFV Manager 25 and the processing of sending the RARP request packet which are performed by the sub vBRAS21_2 and sub vBRAS21_3, sub vBRAS22_1 to sub vBRAS22_3 and sub vBRAS23_1 to sub vBRAS23_3 are similar with the above processing.

Each sub vBRAS may send the register request to the NFV Manager 25 based on a private interaction protocol so as to carry the identification information of the sub vBRAS and information of the vBRAS to which the sub vBRAS belongs. In the example, the MAC address of each sub vBRAS is used as the identification information of the sub vBRAS.

The aggregation switch 26 receives the RARP request packets sent by the sub vBRAS21_1 to sub vBRAS21_3, sub vBRAS22_1 to sub vBRAS22_3, and sub vBRAS23_1 to sub vBRAS23_3, and learns MAC address entries based on a port receiving each RARP packet and the source MAC address of each RARP packet. The aggregation switch 26 may forward each RARP request packet or discard the received RARP request packet.

A user 281 sends a broadcast protocol packet carrying user identification information. The broadcast protocol packet may be a Dynamic Host Configuration Protocol (DHCP) discover packet or a Point to Point Protocol over Ethernet (PPPoE) request packet and etc., which is not limited in the present disclosure. Herein, a source MAC address of the broadcast protocol packet sent by the user 281 is MAC281 which is the user identification information. The DHCP discover packet is taken as an example, the aggregation switch 26 receives the DHCP discover packet, and sends the DHCP discover packet to the NFV Manager 25 based on packet redirection or an ACL entry. The NFV Manager 25 receives the DHCP discover packet and assigns sub vBRAS21_1 for the user 281 by taking the source MAC address of the DHCP discover packet, i.e. MAC_281 as the user identification information.

The NFV Manager 25 may randomly select one sub vBRAS from registered sub vBRASs and assign the user 281 to the selected sub vBRAS. Or, the NFV Manager 25 may select one sub vBRAS based on the number of users or traffic assigned to each sub vBRAS, and assign the user 281 to the selected sub vBRAS, thereby implementing load balancing between the sub vBRAS.

The NFV Manager 25 sends the DHCP discover packet to the sub vBRAS21_1 and notifies that the user 281 is assigned to the sub vBRAS21_1. For example, NFV Manager 25 may modify a destination MAC address of the DHCP discover packet as MAC21_1 which is the MAC address of the selected sub vBRAS21_1, and send the DHCP discover packet having the modified destination MAC address based on a MAC address entry matching with the modified destination MAC address. Or, the NFV Manager 25 may send the DHCP discover packet having the modified destination MAC address of MAC21_1 to the aggregation switch 26 based on redirection or an ACL entry. The aggregation switch 26 receives the DHCP discover packet having the destination MAC address of MAC21_1, searches a MAC table based on the destination MAC address of MAC21_1, finds a matched MAC address entry, and sends the DHCP discover packet via an interface of the matched MAC address entry. Thus, the DHCP discover packet having the destination MAC address of MAC21_1 is sent to the vBRAS21.

The vBRAS21 receives the DHCP discover packet having the destination MAC address of MAC21_1, and sends the DHCP discover packet to the sub vBRAS21_1. The sub vBRAS21_1 receives the DHCP discover packet, identifies that the destination MAC address of DHCP discover packet is the virtual gateway MAC address of the sub vBRAS21_1, and determines the assigned user 281 based on the source MAC address of MAC281. The sub vBRAS21_1 may send a DHCP response packet and assign an IP address for the user 281. If another broadcast protocol packet, e.g. the PPPoE packet is used, the sub vBRAS21_1 may perform subsequent processing based on corresponding protocol, which is not limited herein.

In FIG. 2, the processing of the NFV Manager 25 assigning users from a user 282 to a user N to corresponding vvBRASs is the same as the above processing of assigning the user 281 to the sub vBRAS21_1. The processing of the NFV Manager 25 notifying each sub vBRAS of each vBRAS of the assigned user is the same as the processing of notifying the .sub vBRAS21_1 of the assigned user 281.

As shown in table 1, in the example, the NFV Manager 25 records each sub vBRAS of each vBRAS, and also records the number of users assigned to each sub vBRAS.

TABLE 1

| vBRAS | Sub vBRAS | | | | | | | | |
|---|---|---|---|---|---|---|---|---|---|
| | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
| vBRAS21 | the number of users 5000 | the number of users 3000 | the number of users 3000 | | | | | | |
| vBRAS22 | | | | the number of users 4000 | the number of users 4000 | the number of users 3000 | | | |
| vBRAS23 | | | | | | | the number of users 5000 | the number of users 3000 | the number of users 1000 |

The NFV Manager 25 may assign access users for the sub vBRASs based on the number of users assigned for each sub vBRAS, so as to make the number of access users assigned for each sub vBRAS balanced.

When different users perform different services and generate different traffic, traffic loads of the sub vBRAS may be not balanced.

According to an example of the present disclosure, the NFV Manager 25 assigns access users for each sub vBRAS, and each sub vBRAS monitors the total traffic of the access users and sends running state information of the sub vBRAS to the NFV Manager 25 in real time or regularly. The running state information of each sub vBRAS at least includes the number of access users, traffic of the access users and etc. In the example, each sub vBRAS may send the running state information to the NFV Manager 25 based on the private interaction protocol, and the T-L-V field of the private interaction protocol may be used to carry the running state information.

The NFV Manager 25 receives and stores the running state information of each sub vBRAS, so as to monitor the running state information of each sub vBRAS.

The NFV Manager 25 updates the running state information of each sub vBRAS recorded in table 1 based on the monitored running state information of each sub vBRAS, and the updated running state information is shown in table 2.

TABLE 2

| vBRAS | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
|---|---|---|---|---|---|---|---|---|---|
| vBRAS21 | the number of users 5000, user traffic 500 G | the number of users 3000, user traffic 150 G | the number of users 3000, user traffic 100 G | | | | | | |
| vBRAS22 | | | | the number of users 4000, user traffic 100 G | the number of users 4000, user traffic 100 G | the number of users 3000, user traffic 300 G | | | |
| vBRAS23 | | | | | | | the number of users 5000, user traffic 400 G | the number of users 3000, user traffic 100 G | the number of users 1000, user traffic 100 G |

In table 2, the total number of the access users for the sub vBRAS21_1 to the sub vBRAS21_3 on the vBRAS21 is identical with the total number of the access users for the sub vBRAS22_1 to the sub vBRAS22_3 on the vBRAS22, but the sum of traffic of the access users for the sub vBRAS21_1 to the sub vBRAS21_3 on the vBRAS21 is larger than the sum of traffic of the access users for the sub vBRAS22_1 to the sub vBRAS22_3 on the vBRAS22. The total number of the access users for the sub vBRAS22_1 to the sub vBRAS22_3 on the vBRAS22 is larger than the total number of the access users for the sub vBRAS23_1 to the sub vBRAS23_3 on the vBRAS23, but the sum of traffic of the access users for the sub vBRAS23_1 to the sub vBRAS23_3 on the vBRAS23 is larger than the sum of traffic of the access users for the sub vBRAS22_1 to the sub vBRAS22_3 on the vBRAS22.

The NFV Manager 25 calculates the traffic of the vBRAS21 based on the traffic of the sub vBRAS21_1 to the sub vBRAS21_3 and obtains a result of 750 G; calculates the traffic of the vBRAS22 based on the traffic of the sub vBRAS22_1 to the sub vBRAS22_3 and obtains a result of 500 G and calculates the traffic of the vBRAS23 based on the traffic of the sub vBRAS23_1 to the sub vBRAS23_3 and obtains a result of 600 G.

According to an example of the present disclosure, a maximum traffic threshold is configured as 650 G The NFV Manager 25 determines the vBRAS21 having the traffic higher than the maximum traffic threshold as a source vBRAS, and determines, from two vBRASs having the traffic lower than the maximum traffic threshold, the vBRAS22 having a lowest traffic as a target vBRAS. The NFV Manager 25 determines that the traffic of the access users for the sub vBRAS21_3 is most close to a traffic value obtained by subtracting the maximum traffic threshold from the traffic of the vBRAS21, and thus determines the sub vBRAS21_3 as a migration sub vBRAS. The NFV Manager 25 determines that the traffic of the vBRAS22 is lower than the maximum traffic threshold after the sub vBRAS21_3 is migrated to the vBRAS22.

According to another example of the present disclosure, the NFV Manager 25 determines the vBRAS21 having the highest traffic as a source vBRAS, determines the vBRAS23 having the lowest traffic as a target vBRAS, and calculates an average traffic based on the traffic of the vBRAS21, vBRAS22 and vBRAS23. The NFV Manager 25 selects from the vBRAS21 a sub vBRAS having the traffic of the access users most closed to a traffic value obtained by subtracting the average traffic from the traffic of the vBRAS21.

The NFV Manager 25 assigns a first Transmission Control Protocol (TCP) port number for the vBRAS21, and assigns a second TCP port number for the vBRAS22. The vBRAS21 and vBRAS22 are notified of the first TCP port number and the second TCP port number respectively. The NFV Manager 25 notifies the vBRAS21 of that the sub vBRAS21_3 is migrated to the vBRAS22.

The vBRAS21 and vBRAS22 establishes a TCP connection based on the first TCP port number and the second TCP port number. The vBRAS21 sends the data relevant to the sub vBRAS21_3 to the vBRAS22 via the TCP connection.

In the example of the present disclosure, each sub vBRAS starts a user mode process, and address space of the user mode process records data relevant to the sub vBRAS. The address space of the user mode process of each sub vBRAS is separate from each other. The vBRAS21 may send data recorded in the address space of the user mode process of the sub vBRAS21_3 to the vBRAS22.

Figure 3A:
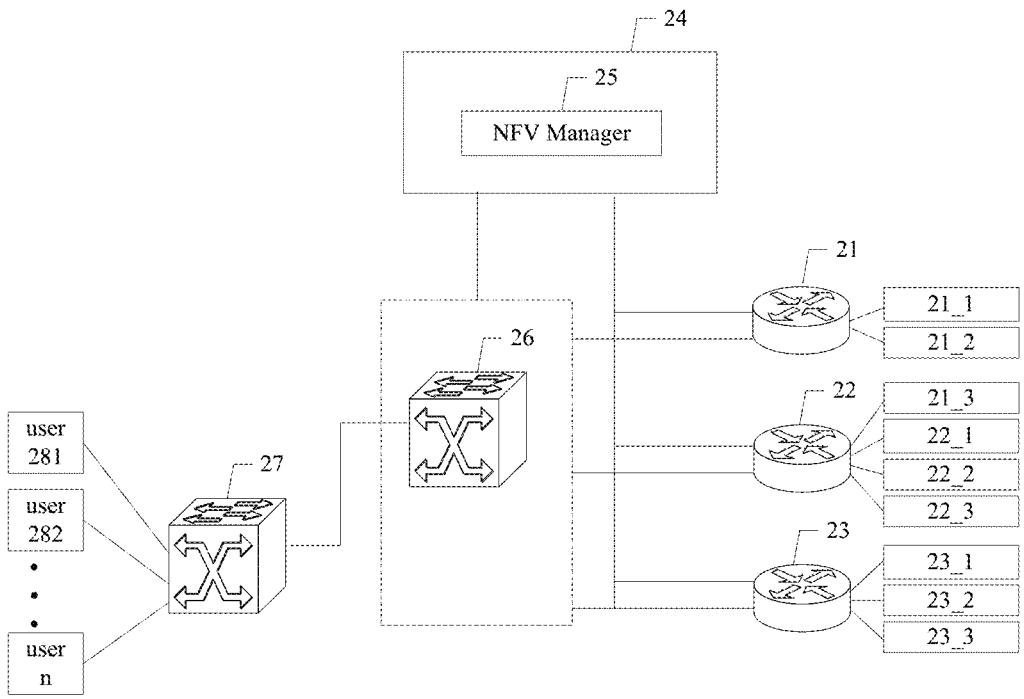
FIGS. 3A and 3B are diagrams illustrating a NFV Manager shown in FIG. 2 making a sub vBRAS of access users migrate according to an example of the present disclosure.

The vBRAS22 receives the data relevant to the sub vBRAS21_3, and starts a new user mode process. The address space of the new user mode process may reuse original address space of the user mode process of the sub vBRAS21_3. The data relevant to the sub vBRAS21_3 are stored in the address space of the new user mode process. As shown in FIG. 3A, the sub vBRAS21_3 is migrated to the vBRAS22.

The NFV Manager 25 updates the table 2 and obtains table 3.

TABLE 3

| vBRAS | Sub vBRAS | | | | | | | | |
|---|---|---|---|---|---|---|---|---|---|
| | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
| vBRAS21 | the number of users 5000, user traffic 500 G | the number of users 3000, user traffic 150 G | | | | | | | |
| vBRAS22 | | | the number of users 3000, user traffic 100 G | the number of users 4000, user traffic 100 G | the number of users 4000, user traffic 100 G | the number of users 3000, user traffic 300 G | | | |
| vBRAS23 | | | | | | | the number of users 5000, user traffic 400 G | the number of users 3000, user traffic 100 G | the number of users 1000, user traffic 100 G |

The vBRAS22 receives the data relevant to the sub vBRAS21_3 from the vBRAS21 and closes the TCP connection between the vBRAS21 and the vBRAS22.

The sub vBRAS21_3 sends a RARP response packet after the sub vBRAS21_3 is migrated to the vBRAS22. In the RARP response packet, a source MAC address is MAC21_3 and a destination MAC address is a MAC address of an interface actually sending the RARP response packet by the sub vBRAS21_3. Hence, the RARP response packet sent by the sub vBRAS21_3 will not be broadcast in the vlan nor sent to other vBRAS. The aggregation switch 26 receives the RARP response packet sent by the sub vBRAS21_3, finds a MAC address entry matching with the source MAC address, i.e. MAC21_3 from the MAC table, and updates an port in the matched MAC address entry as an port receiving the RARP response packet. The aggregation switch 26 may send the RARP response packet to the vBRAS21 according the destination address of the RARP response packet. Protocol packets and data packets sent from users assigned to the sub vBRAS21_3 to the sub vBRAS21_3 which is the virtual network gateway will be sent to the sub vBRAS22 based on the updated MAC address entry. Hence, the users accessing the sub vBRAS21_3 are migrated to the vBRAS22.

In the above examples, the migration of the users between different vBRASs is implemented via the migration of the sub vBRAS between different vBRASs. The data relevant to the migration sub vBRAS are migrated to the target vBRAS, thus original service access of the users accessing the migration sub vBRAS is not affected. On the premise that the user is online, the user may migrate between different vBRASs, expansion and contraction of NFV network nodes are optimized, and network resilience of the NFV network is further improved.

According to an example of the present disclosure, it is supposed that, after a certain period of time, the NFV Manager 25 updates the table 3 and obtains a table 4 based on the user traffic notified by each sub vBRAS.

TABLE 4

| vBRAS | Sub vBRAS | | | | | | | | |
|---|---|---|---|---|---|---|---|---|---|
| | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
| vBRAS21 | the number of users 5000, user traffic 400 G | the number of users 3000, user traffic 100 G | | | | | | | |
| vBRAS22 | | | the number of users 3000, user traffic 100 G | the number of users 4000, user traffic 100 G | the number of users 4000, user traffic 100 G | the number of users 3000, user traffic 300 G | | | |

TABLE 4-continued

| | Sub vBRAS | | | | | | | | |
|---|---|---|---|---|---|---|---|---|---|
| vBRAS | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
| vBRAS23 | | | | | | | the number of users 5000, user traffic 50 G | the number of users 3000, user traffic 30 G | the number of users 1000, user traffic 20 G |

According to an example of the present disclosure, a minimum traffic threshold is configured as 150 G. The NFV Manager 25 determines the vBRAS23 having the traffic lower than the minimum traffic threshold as a source vBRAS, and determines the vBRAS21 having the traffic lower than the maximum traffic threshold as a target vBRAS. The NFV Manager 25 determines all sub vBRASs on the vBRAS23, i.e. the sub vBRAS23_1 to sub vBRAS23_3 as migration sub vBRASs. If there are at least two vBRASs having the traffic lower than the maximum traffic threshold, the vBRAS having the lowest traffic may be determined as the target vBRAS.

The NFV Manager 25 assigns TCP port numbers for the vBRAS21 and vBRAS23 respectively. For example, the NFV Manager 25 assigns a third TCP port number for the vBRAS21, and assigns a fourth TCP port number for the vBRAS23. The vBRAS21 and vBRAS23 are notified of the third TCP port number and the fourth TCP port number respectively. The NFV Manager 25 notifies the vBRAS23 that the sub vBRAS23_1, the sub vBRAS23_2 and the sub vBRAS23_3 are migrated to the vBRAS21. The NFV Manager 25 determines all of sub vBRASs of the vBRAS23 are migrated, and sends a packet having a close identifier to the vBRAS23 based on the private interaction protocol to notify the vBRAS23 to close.

The vBRAS21 and vBRAS23 establishes a TCP connection between the vBRAS21 and vBRAS23 based on the notified third TCP port number and the fourth TCP port number.

The vBRAS23 sends data in address space of the user mode process for the sub vBRAS23_1, data in address space of the user mode process for the sub vBRAS23_2 and data in address space of the user mode process for the sub vBRAS23_3 to the vBRAS21 via the TCP connection.

The vBRAS21 receives the data in the address space of the user mode process for the sub vBRAS23_1, and starts a new user mode process. The address space of the new user mode process may reuse the original address space of the user mode process for the sub vBRAS23_1 to store the data relevant to the sub vBRAS23_1. The vBRAS21 receives the data in the address space of the user mode process for the sub vBRAS23_2, and starts a new user mode process. The address space of the new user mode process may reuse the original address space of the user mode process for the sub vBRAS23_2 to store the data relevant to the sub vBRAS23_2. The vBRAS21 receives the data in the address space of the user mode process for the sub vBRAS23_3, and starts a new user mode process. The address space of the new user mode process may reuse the original address space of the user mode process for the sub vBRAS23_3 to store the data relevant to the sub vBRAS23_3.

Figure 3B:
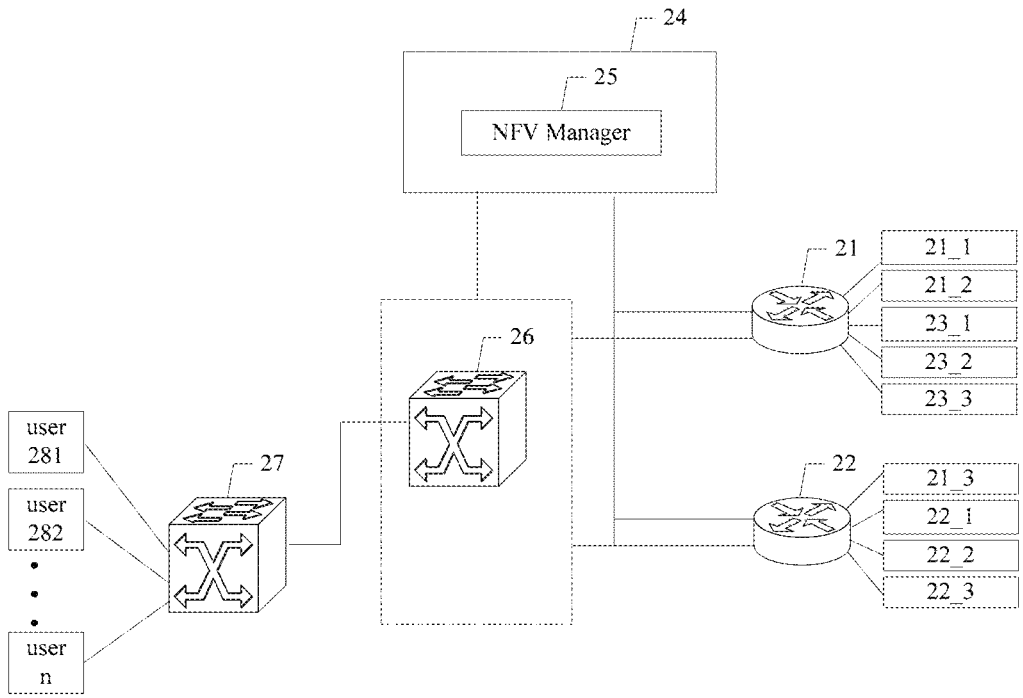

After receiving the data relevant to the sub vBRAS23_1, the data relevant to the sub vBRAS23_2 and the data relevant to the sub vBRAS23_3, the vBRAS21 closes the TCP connection between the vBRAS21 and the vBRAS23. As shown in FIG. 3B, the sub vBRAS23_1, the sub vBRAS23_2 and the sub vBRAS23_3 are migrated to the vBRAS21.

After sending the data relevant to the sub vBRAS23_1, the data relevant to the sub vBRAS23_2 and the data relevant to the sub vBRAS23_3, the vBRAS23 closes the TCP connection between the vBRAS23 and the vBRAS21. The vBRAS23 may perform a close operation based on a close notification received from the NFV Manager 25.

The NFV Manager 25 updates the table 4 and obtains a table 5.

TABLE 5

| | Sub vBRAS | | | | | | | | |
|---|---|---|---|---|---|---|---|---|---|
| vBRAS | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
| vBRAS21 | the number of users 5000, user traffic 400 G | the number of users 3000, user traffic 100 G | | | | | the number of users 5000, user traffic 50 G | the number of users 3000, user traffic 30 G | the number of users 1000, user traffic 20 G |

TABLE 5-continued

| | Sub vBRAS | | | | | | | | |
|---|---|---|---|---|---|---|---|---|---|
| vBRAS | Sub vBRAS 21_1 | Sub vBRAS 21_2 | Sub vBRAS 21_3 | Sub vBRAS 22_1 | Sub vBRAS 22_2 | Sub vBRAS 22_3 | Sub vBRAS 23_1 | Sub vBRAS 23_2 | Sub vBRAS 23_3 |
| vBRAS22 | | | the number of users 3000, user traffic 100 G | the number of users 4000, user traffic 100 G | the number of users 4000, user traffic 100 G | the number of users 3000, user traffic 300 G | | | |
| vBRAS23 | | | | | | | | | |

After being migrated to the vBRAS21, the sub vBRAS23_1, the sub vBRAS23_2 and sub vBRAS23_3 send a RARP response packet respectively.

The aggregation switch 26 receives the RARP response packets sent by the sub vBRAS23_1, the sub vBRAS23_2 and sub vBRAS23_3, finds MAC address entries matching with the source MAC addresses of the RARP response packets, and updates the matched MAC address entries based on ports receiving the RARP response packets. Hence, the users accessing the sub vBRAS23_1, the sub vBRAS23_2 and sub vBRAS23_3 are migrated to the vBRAS21.

According to the above examples of the present disclosure, when load of a certain vBRAS is lower than a preconfigured minimum load, all of the sub vBRASs on the vBRAS having the load lower than the preconfigured minimum load are migrated to another vBRAS, and the vBRAS having the load lower than the preconfigured minimum load is closed. Hence, even if the vBRAS is closed, the users originally accessing each sub vBRAS of the closed vBRAS may be migrated to another vBRAS on the premise that the users are online, and it is unnecessary for the users to log online again by accessing to a vBRAS reassigned by the NFV Manager 25. Therefore, expansion and contraction of NFV network nodes are optimized, and network resilience of the NFV network is further improved.

Figure 4:
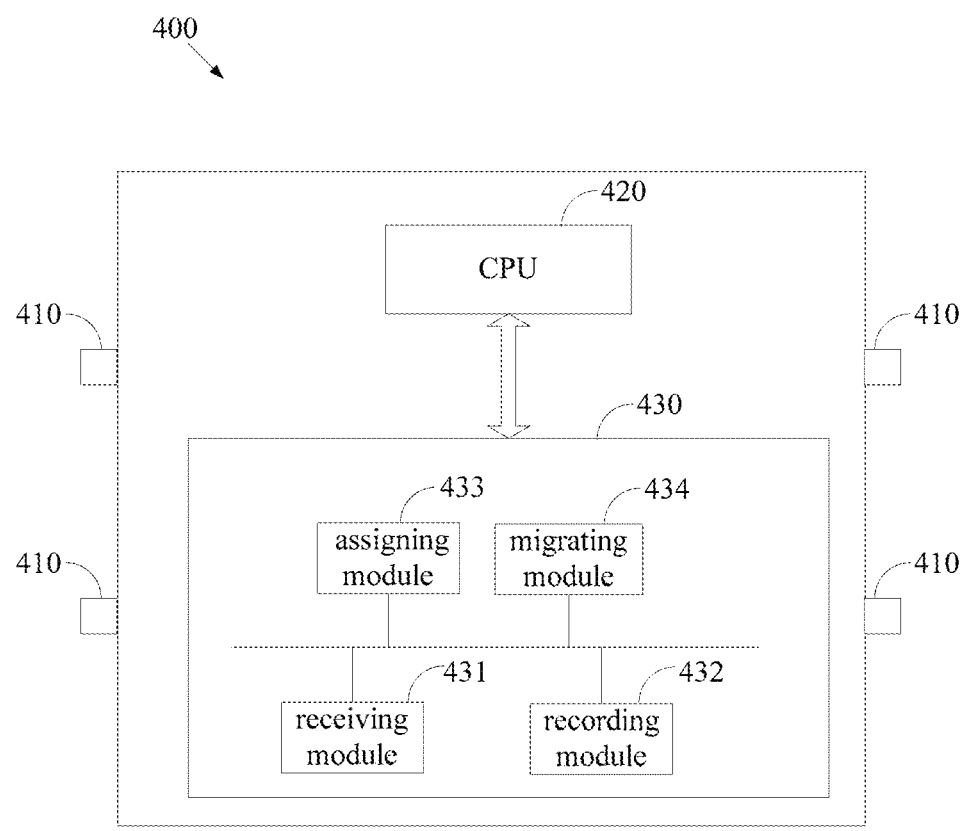
FIG. 4 is a diagram illustrating a user migration apparatus according to an example of the present disclosure.

FIG. 4 is a diagram illustrating a user migration apparatus based on an example of the present disclosure. The user migration apparatus 400 may be applied to a NFV Manager. As shown in FIG. 4, the user migration apparatus 400 at least includes multiple ports 410 to receive and send packets, a processor 420 and storage 430. The storage 430 may store multiple machine-readable instruction modules executed by the processor 420. The machine-readable instruction modules may include a receiving module 431, a recording module 432, an assigning module 433 and a migrating module 434.

The receiving module 431 is to receive user traffic notified by each sub vBRAS of each vBRAS. The migrating module 434 is to calculate user traffic of each vBRAS, select a source vBRAS and a target vBRAS from all of the vBRASs and select a migration sub vBRAS needing to migrate from the source vBRAS to the target vBRAS, and notify the source vBRAS to send data relevant to the migration sub vBRAS to the target vBRAS.

In an example, the migrating module 434 is to monitor traffic of each vBRAS by calculating the traffic of each vBRAS. The migrating module 434 may determine a vBRAS having traffic higher than a maximum traffic threshold as a source vBRAS, determine from vBRASs having traffic lower than the maximum traffic threshold a vBRAS having a lowest traffic as a target vBRAS, and determine from multiple sub vBRASs of the source vBRAS a sub vBRAS having user traffic most close to a traffic value obtained by subtracting the maximum traffic threshold from the traffic of source vBRAS.

In an example, the migrating module 434 may determine a vBRAS having highest traffic as a source vBRAS, determine a vBRAS having lowest traffic as a target vBRAS, calculate an average traffic based on the traffic of each vBRAS, and determine from multiple sub vBRASs of the source vBRAS a sub vBRAS having user traffic most close to a traffic value obtained by subtracting the average traffic from the traffic of source vBRAS.

In an example, the migrating module 434 may determine a vBRAS having traffic lower than a minimum traffic threshold as a source vBRAS, determines a vBRAS having traffic lower than the maximum traffic threshold as a target vBRAS, and determine all sub vBRASs on the source vBRAS as migration sub vBRASs.

In an example, the migrating module 434 is further to assign TCP port numbers for the source vBRAS and the target vBRAS respectively, and to notify the source vBRAS and the target vBRAS of the assigned TCP port numbers.

In an example, the receiving module 431 is to receive multiple register request packets and multiple user broadcast protocol packets. The recording module 432 is to record each vBRAS and each sub vBRAS of each vBRAS based on identification information of a sub vBRAS and vBRAS information included in each register request packet. The assigning module 433 is to assign a user to each sub vBRAS of each vBRAS based on user identification information of each user broadcast protocol packet.

In an example, the migrating module 434 is to determine that all sub vBRASs of the source vBRAS are migrated and notify the source vBRAS to close.

The NFV Manager having the user migration apparatus 400 may make the sub vBRAS having accessed users migrate between the vBRASs by taking the sub vBRAS as a unit. Hence, users may migrate between different vBRASs, and thus network resilience of the NFV network is improved.

The foregoing are some examples of the present disclosure and are not used to limit the protection scope of the present disclosure. Any modification, equivalent substitution and improvement without departing from the spirit and principle of the present disclosure are within the protection scope of the present disclosure.

What is claimed is:
1. A user migration method, comprising:
   receiving user traffic notified by every sub virtual Broadband Remote Access Server (vBRAS) of each of mul- tiple vBRASs, wherein in each sub vBRAS is started a user mode process having an address space independent from an address space of a user mode process of another vBRAS;

calculating user traffic of each of the multiple vBRASs, wherein the user traffic of a vBRAS is calculated as a sum of the user traffic of each sub vBRAS of the vBRAS;

selecting a source vBRAS and a target vBRAS from the multiple vBRASs based on the user traffic of each of the multiple vBRASs;

selecting a migration sub vBRAS needing to migrate from the source vBRAS to the target vBRAS based on the user traffic of the source vBRAS and the user traffic of each of the sub vBRASs of the source vBRAS; and notifying the source vBRAS to send data relevant to the migration sub vBRAS in the address space of the user mode process of the migration sub vBRAS to the target vBRAS, wherein the data relevant to the migration sub vBRAS include a MAC address of the migration sub vBRAS which is used as identification information of the migration sub vBRAS, the number of users accessing the migration sub vBRAS, and traffic of the users accessing the migration sub vBRAS.

2. The method of claim 1, further comprising:

prior to notifying the source vBRAS to send data relevant to the migration sub vBRAS to the target vBRAS, assigning Transmission Control Protocol (TCP) port numbers for the source vBRAS and the target vBRAS respectively;

notifying the source vBRAS and the target vBRAS of the assigned TCP port numbers, the assigned TCP port numbers being used by the source vBRAS and the target vBRAS to establish a TCP connection to transmit the data relevant to the migration sub vBRAS.

3. The method of claim 1, further comprising:

prior to receiving user traffic notified by every sub vBRAS of each of multiple vBRASs, receiving a register request packet sent by the each sub vBRAS of the each vBRAS;

recording the each vBRAS and the each sub vBRAS of the each vBRAS based on sub vBRAS identification information and vBRAS information comprised in each of the register request packets;

receiving user broadcast protocol packets sent by different users;

assigning a user to the each sub vBRAS of the each vBRAS based on user identification information of each user broadcast protocol packet;

notifying the user assigned to the each sub vBRAS of the each vBRAS.

4. The method of claim 1, further comprising:

determining all sub vBRAS of the source vBRAS are migrated; and notifying the source vBRAS to close.

5. A user migration apparatus, comprising:

a processor; and a storage storing machine-readable instructions, wherein when the machine-readable instructions are being read and executed, the processor is caused to:

receive user traffic notified by every sub virtual Broadband Remote Access Server (vBRAS) of each of multiple vBRASs, wherein in each sub vBRAS is started a user mode process having an address space independent from an address space of a user mode process of another sub vBRAS; and calculate user traffic of each of the multiple vBRASs, wherein the user traffic of a vBRAS is calculated as a sum of the user traffic of each sub vBRAS of the vBRAS;

select a source vBRAS and a target vBRAS from the multiple vBRASs based on the user traffic of each of the multiple vBRASs;

select a migration sub vBRAS needing to migrate from the source vBRAS to the target vBRAS based on the user traffic of the source vBRAS and the user traffic of each of the sub vBRASs of the source vBRAS; and notify the source vBRAS to send data relevant to the migration sub vBRAS in the address space of the user mode process of the migration sub vBRAS to the target vBRAS, wherein the data relevant to the migration sub vBRAS include a MAC address of the migration sub vBRAS which is used as identification information of the migration sub vBRAS, the number of users accessing the migration sub vBRAS, and traffic of the users accessing the migration sub vBRAS.

6. The apparatus of claim 5, wherein prior to notifying the source vBRAS to send data relevant to the migration sub vBRAS to the target vBRAS, the processor is further caused to:

assign TCP port numbers for the source vBRAS and the target vBRAS respectively; and notify the source vBRAS and the target vBRAS of the assigned TCP port numbers.

7. The apparatus of claim 5, wherein prior to receiving user traffic notified by every sub vBRAS of each of multiple vBRASs, the processor is further caused to:

receive multiple register request packets and multiple user broadcast protocol packets;

record the each vBRAS and the each sub vBRAS of the each vBRAS based on sub vBRAS identification information and vBRAS information of each of the register request packets;

assign a user to the each sub vBRAS of the each vBRAS based on user identification information of each of the user broadcast protocol packets; and notify the user assigned to the each sub vBRAS of the each vBRAS.

8. The apparatus of claim 5, wherein the processor is further caused to:

determine all sub vBRAS of the source vBRAS are migrated and notify the source vBRAS to close.

9. A non-transitory machine readable storage medium, comprising instructions for making a processor perform the following operations while being executed:

receiving user traffic notified by every sub virtual Broadband Remote Access Server (vBRAS) of each of multiple vBRASs, wherein in each sub vBRAS is started a user mode process having an address space independent from an address space of a user mode process of another sub vBRAS;

calculating user traffic of each of the multiple vBRASs, wherein the user traffic of a vBRAS is calculated as a sum of the user traffic of each sub vBRAS of the vBRAS;

selecting a source vBRAS and a target vBRAS from the multiple vBRASs based on the user traffic of each of the multiple vBRASs;

selecting a migration sub vBRAS needing to migrate from the source vBRAS to the target vBRAS based on the user traffic of the source vBRAS and the user traffic of each of the sub vBRASs of the source vBRAS; and notifying the source vBRAS to send data relevant to the migration sub vBRAS in the address space of the user mode process of the migration sub vBRAS to the target vBRAS, wherein the data relevant to the migration sub vBRAS include a MAC address of the migration sub vBRAS which is used as identification information of the migration sub vBRAS, the number of users accessing the migration sub vBRAS, and traffic of the users accessing the migration sub vBRAS.

10. The non-transitory machine readable storage medium of claim 9, prior to notifying the source vBRAS to send data relevant to the migration sub vBRAS to the target vBRAS, the instructions further make the processor perform the following operations:

assigning Transmission Control Protocol (TCP) port numbers for the source vBRAS and the target vBRAS respectively; and notifying the source vBRAS and the target vBRAS of the assigned TCP port numbers, the assigned TCP port numbers being used by the source vBRAS and the target vBRAS to establish a TCP connection to transmit the data relevant to the migration sub vBRAS.

11. The non-transitory machine readable storage medium of claim 9, prior to receiving user traffic notified by every sub vBRAS of each of multiple vBRASs, the instructions further make the processor perform the following operations:

receiving a register request packet sent by the each sub vBRAS of the each vBRAS;

recording the each vBRAS and the each sub vBRAS of the each vBRAS based on sub vBRAS identification information and vBRAS information comprised in each of the register request packets;

receiving user broadcast protocol packets sent by different users;

assigning a user to the each sub vBRAS of the each vBRAS based on user identification information of each user broadcast protocol packet; and notifying the user assigned to the each sub vBRAS of the each vBRAS.

12. The non-transitory machine readable storage medium of claim 9, the instructions further make the processor perform the following operations:

determining all sub vBRAS of the source vBRAS are migrated; and notifying the source vBRAS to close.

* * * * *